(12) United States Patent
Hamada et al.

(10) Patent No.: US 11,912,154 B2
(45) Date of Patent: Feb. 27, 2024

(54) POWER MANAGEMENT SYSTEM, SERVER, AND POWER SUPPLY AND DEMAND ADJUSTMENT METHOD

(71) Applicant: TOYOTA JIDOSHA KABUSHIKI KAISHA, Toyota (JP)

(72) Inventors: Shigetaka Hamada, Nisshin (JP); Haruka Hirose, Toyota (JP); Yusuke Horii, Nagoya (JP); Toru Nakamura, Toyota (JP); Takaaki Sano, Izumi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 17/528,341

(22) Filed: Nov. 17, 2021

(65) Prior Publication Data

US 2022/0194257 A1 Jun. 23, 2022

(30) Foreign Application Priority Data

Dec. 22, 2020 (JP) ................. 2020-212351

(51) Int. Cl.
*B60L 53/68* (2019.01)
*H02J 13/00* (2006.01)
(Continued)

(52) U.S. Cl.
CPC .............. *B60L 53/68* (2019.02); *B60L 53/63* (2019.02); *G05B 19/042* (2013.01); *G08G 1/142* (2013.01);
(Continued)

(58) Field of Classification Search
CPC .......... B60L 53/68; B60L 53/63; B60L 53/67; B60L 2240/80; B60L 55/00;
(Continued)

(56) References Cited

U.S. PATENT DOCUMENTS

| 2008/0281663 A1* | 11/2008 | Hakim | H02J 3/466 705/7.25 |
| 2010/0076825 A1* | 3/2010 | Sato | B60L 53/65 705/14.1 |

(Continued)

FOREIGN PATENT DOCUMENTS

| JP | 2013041324 A | * | 2/2013 |
| JP | 2020-028198 A | | 2/2020 |

OTHER PUBLICATIONS

"Lam et al., Coordinated Autonomous Vehicle Parking for Vehicle-to-Grid Services: Formulation and Distributed Algorithm, 2013, IEEE, https://ieeexplore.ieee.org/stamp/stamp.jsp?tp=&arnumber=7822948" (Year: 2013).*

*Primary Examiner* — Santosh R Poudel
(74) *Attorney, Agent, or Firm* — Finnegan, Henderson, Farabow, Garrett & Dunner, LLP

(57) ABSTRACT

A power management system includes a plurality of power adjustment resources electrically connected to a microgrid. The plurality of power adjustment resources include a plurality of EVSEs, each of EVSEs including a parking space. When any one of a plurality of power feeding vehicles is parked in the parking space, an EVSE enables power feeding from a vehicle parked in the parking space to the microgrid. A CEMS server manages the parking space. When a balance of power supply and demand in the microgrid is in an overdemand state, the CEMS server allocates the parking space to a power feeding vehicle that responds to a request for power feeding to the microgrid, of the plurality of power feeding vehicles.

10 Claims, 5 Drawing Sheets

(51) Int. Cl.
*H02J 3/38* (2006.01)
*G08G 1/14* (2006.01)
*G05B 19/042* (2006.01)
*B60L 53/63* (2019.01)

(52) U.S. Cl.
CPC ........ *H02J 3/381* (2013.01); *H02J 13/00022* (2020.01); *G05B 2219/2639* (2013.01); *H02J 2300/24* (2020.01)

(58) Field of Classification Search
CPC .......... G05B 19/042; G05B 2219/2639; G08G 1/142; H02J 3/381; H02J 13/00022; H02J 2300/24; H02J 3/00; H02J 3/322; Y02B 90/20; Y02E 10/56; Y04S 40/126
See application file for complete search history.

(56) References Cited

U.S. PATENT DOCUMENTS

| | | | | |
|---|---|---|---|---|
| 2016/0371608 | A1* | 12/2016 | Kahng | G06Q 10/02 |
| 2018/0225969 | A1* | 8/2018 | Baughman | G06Q 10/101 |
| 2019/0275910 | A1* | 9/2019 | Inoue | B60L 55/00 |
| 2021/0331600 | A1* | 10/2021 | Hishida | B60L 53/63 |
| 2022/0358841 | A1* | 11/2022 | Colon | G08G 1/148 |

* cited by examiner

FIG.3

《RESERVATION QUOTAS OF PARKING SPACES》

| LOCATION / TIME SLOT | PARKING SPACE A | PARKING SPACE B | PARKING SPACE C | ... |
|---|---|---|---|---|
| ... | ... | ... | ... | ... |
| 10:00~11:00 | RESERVED | RESERVED | AVAILABLE | ... |
| 11:00~12:00 | AVAILABLE | RESERVED | ALLOCATED TO POWER FEEDING VEHICLE | ... |
| 12:00~13:00 | AVAILABLE | RESERVED | ALLOCATED TO POWER FEEDING VEHICLE | ... |
| 13:00~14:00 | RESERVED | RESERVED | RESERVED | ... |
| ... | ... | ... | ... | ... |

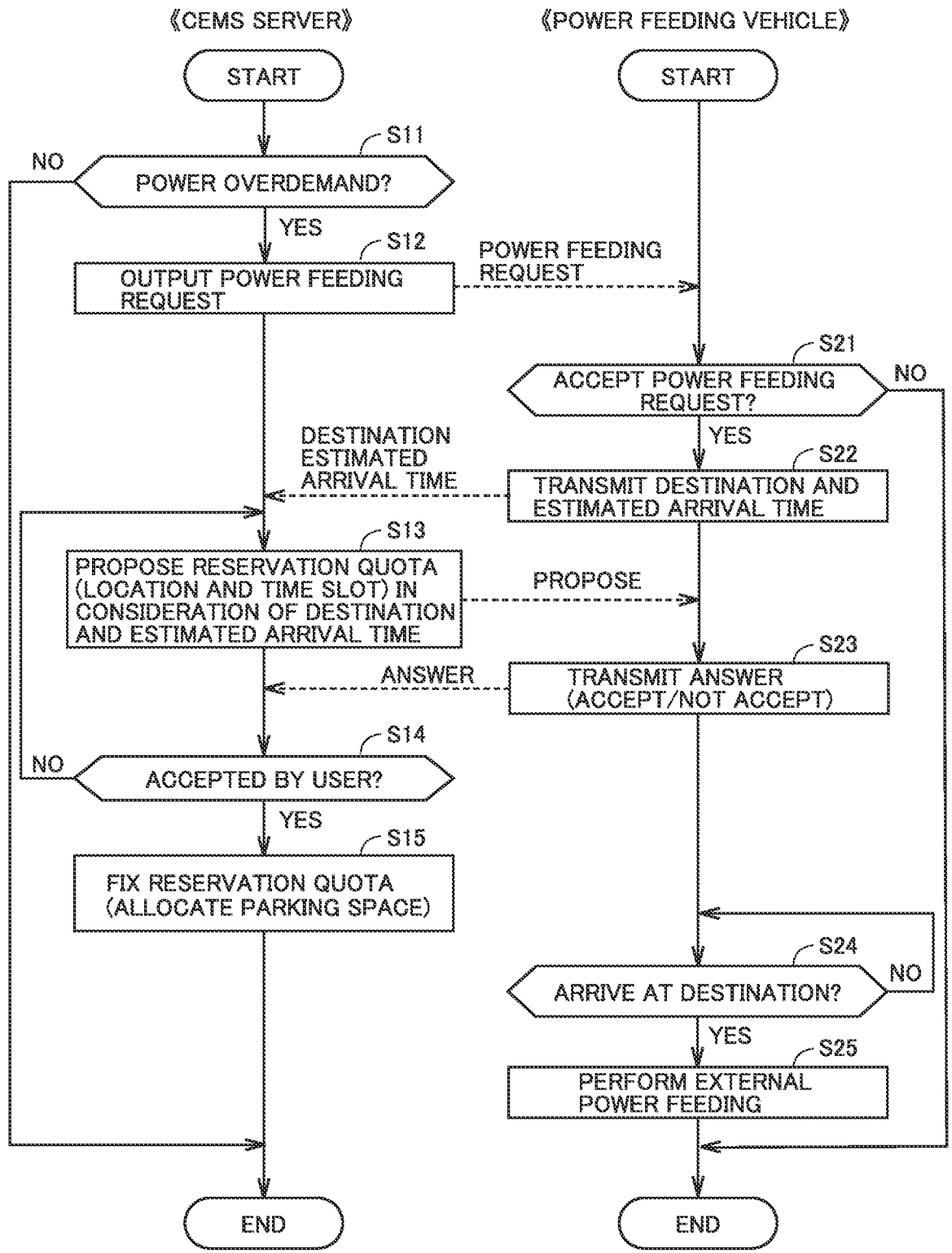

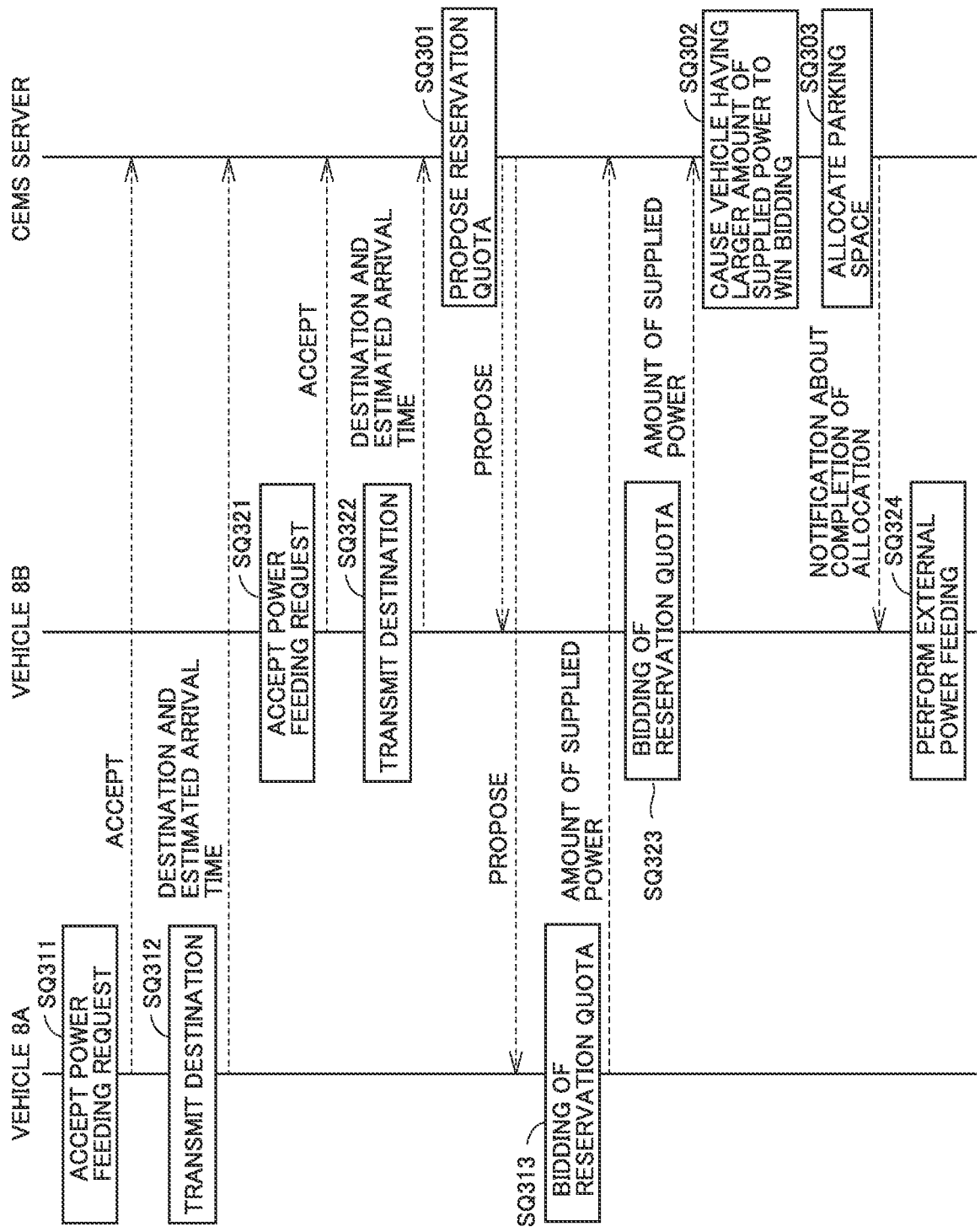

POWER MANAGEMENT SYSTEM, SERVER, AND POWER SUPPLY AND DEMAND ADJUSTMENT METHOD

This nonprovisional application is based on Japanese Patent Application No. 2020-212351 filed on Dec. 22, 2020 with the Japan Patent Office, the entire contents of which are hereby incorporated by reference.

BACKGROUND

Field

The present disclosure relates to a power management system, a server, and a power supply and demand adjustment method.

Description of the Background Art

Japanese Patent Laying-Open No. 2020-28198 discloses a control system for a microgrid. This patent literature describes that turning on and off of a large power load in the microgrid may cause voltage fluctuations in the microgrid.

SUMMARY

In a power grid such as a microgrid, it is required to maintain a balance of power supply and demand for power stabilization. A plurality of power adjustment resources may be electrically connected to the power grid. Specifically, vehicles such as battery electric vehicles and plug-in hybrid electric vehicles may be connected to the power grid. When many vehicles try to perform charging simultaneously, the balance of power supply and demand enters an overdemand state, which may bring about a situation in which the vehicles cannot perform charging immediately. It is also required to maintain the balance of power supply and demand in order to enable many vehicles to perform charging.

The present disclosure has been made to solve the above-described problem, and an object of the present disclosure is to maintain a balance of power supply and demand in a power grid.

(1) A power management system according to a first aspect of the present disclosure includes: a plurality of power adjustment resources electrically connected to a power grid; and a server that manages the plurality of power adjustment resources. The plurality of power adjustment resources include a plurality of power facilities, each of the plurality of power facilities including a parking space. When any one of a plurality of power feeding vehicles is parked in the parking space, a power facility including the parking space enables power feeding from a vehicle parked in the parking space to the power grid. The server manages the parking space. When a balance of power supply and demand in the power grid is in an overdemand state, the server allocates the parking space to a power feeding vehicle that responds to a request for power feeding to the power grid, of the plurality of power feeding vehicles.

(2) When any one of a plurality of charging vehicles is parked in the parking space, each of the plurality of power facilities enables charging from the power grid to a charging vehicle parked in the parking space. When the balance of power supply and demand in the power grid is in the overdemand state and at least a part of the plurality of charging vehicles await charging, the server allocates the parking space to the power feeding vehicle.

In the configuration in (1) and (2) described above, when the balance of power supply and demand in the power grid is in the overdemand state, and particularly when there are charging vehicles that await charging from the power grid, the parking space for power feeding to the power grid is allocated to a power feeding vehicle that is not performing power feeding to the power grid. The allocation of the parking space may motivate a user of the power feeding vehicle to accept power feeding from the power feeding vehicle to the power grid. As a result of power feeding from the power feeding vehicle to the power grid, the balance of power supply and demand in the power grid is improved. Therefore, according to the configuration in (1) and (2) described above, the balance of power supply and demand in the power grid can be maintained.

(3) When there is a time slot in which the balance of power supply and demand is expected to enter the overdemand state, the server reserves the parking space for the power feeding vehicle so as to correspond to the time slot.

According to the configuration in (3) described above, the balance of power supply and demand in the power grid can also be maintained in the time slot in which the balance of power supply and demand is expected to enter the overdemand state in the future.

(4) The server sets a time period of allocation of the parking space to the power feeding vehicle longer, when a degree of overdemand in the balance of power supply and demand is larger than a prescribed amount, as compared with when the degree is smaller than the prescribed amount.

According to the configuration in (4) described above, when the degree of overdemand in the balance of power supply and demand is larger than the prescribed amount, i.e., when the necessity to improve the balance of power supply and demand is great, the time period of allocation of the parking space is set longer, which makes the incentive of allocation of the parking space stronger. This increases the possibility that the user accepts power feeding from the power feeding vehicle to the power grid, and thus, the balance of power supply and demand in the power grid can be maintained more reliably.

(5) When there are a plurality of power feeding vehicles that respond to the request for power feeding, the server allocates the parking space to a power feeding vehicle that supplies larger electric power to the power grid, of the plurality of power feeding vehicles.

When there is a shortage of parking spaces, to which vehicle the parking space is allocated is problematic. According to the configuration in (5) described above, the parking space is allocated to the power feeding vehicle that supplies larger electric power to the power grid, and thus, the balance of power supply and demand in the power grid can be maintained more reliably.

(6) A server according to a second aspect of the present disclosure manages a plurality of power adjustment resources electrically connected to a power grid. The plurality of power adjustment resources include a plurality of power facilities, each of the plurality of power facilities including a parking space. When any one of a plurality of power feeding vehicles is parked in the parking space, a power facility including the parking space enables power feeding from a vehicle parked in the parking space to the power grid. The server includes: a processor; and a memory that stores a program executed by the processor. When a balance of power supply and demand in the power grid is in an overdemand state, the processor allocates the parking space to a power feeding vehicle that responds to a request for power feeding to the power grid, of the plurality of power feeding vehicles.

According to the method in (6) described above, the balance of power supply and demand in the power grid can be maintained, similarly to the configuration in (1) described above.

(7) A power supply and demand adjustment method according to a third aspect of the present disclosure manages a plurality of power adjustment resources electrically connected to a power grid. The plurality of power adjustment resources include a plurality of power facilities, each of the plurality of power facilities including a parking space. When any one of a plurality of power feeding vehicles is parked in the parking space, a power facility including the parking space enables power feeding from a vehicle parked in the parking space to the power grid. The method includes a first step and a second step. The first step is when a balance of power supply and demand in the power grid is in an overdemand state, allocating the parking space to a power feeding vehicle that responds to a request for power feeding to the power grid, of the plurality of power feeding vehicles. The second step is causing the power feeding vehicle that receives allocation of the parking space to perform power feeding to the power grid.

According to the method in (7) described above, the balance of power supply and demand in the power grid can be maintained, similarly to the configurations in (1) and (6) described above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a conceptual diagram for illustrating an example of reservation quotas of parking spaces.

FIG. 4 is a flowchart showing a process related to allocation of a parking space in the first embodiment.

FIG. 5 is a sequence diagram showing a process related to allocation of a parking space in a second embodiment.

DESCRIPTION OF THE PREFERRED EMBODIMENTS

Figure 1:
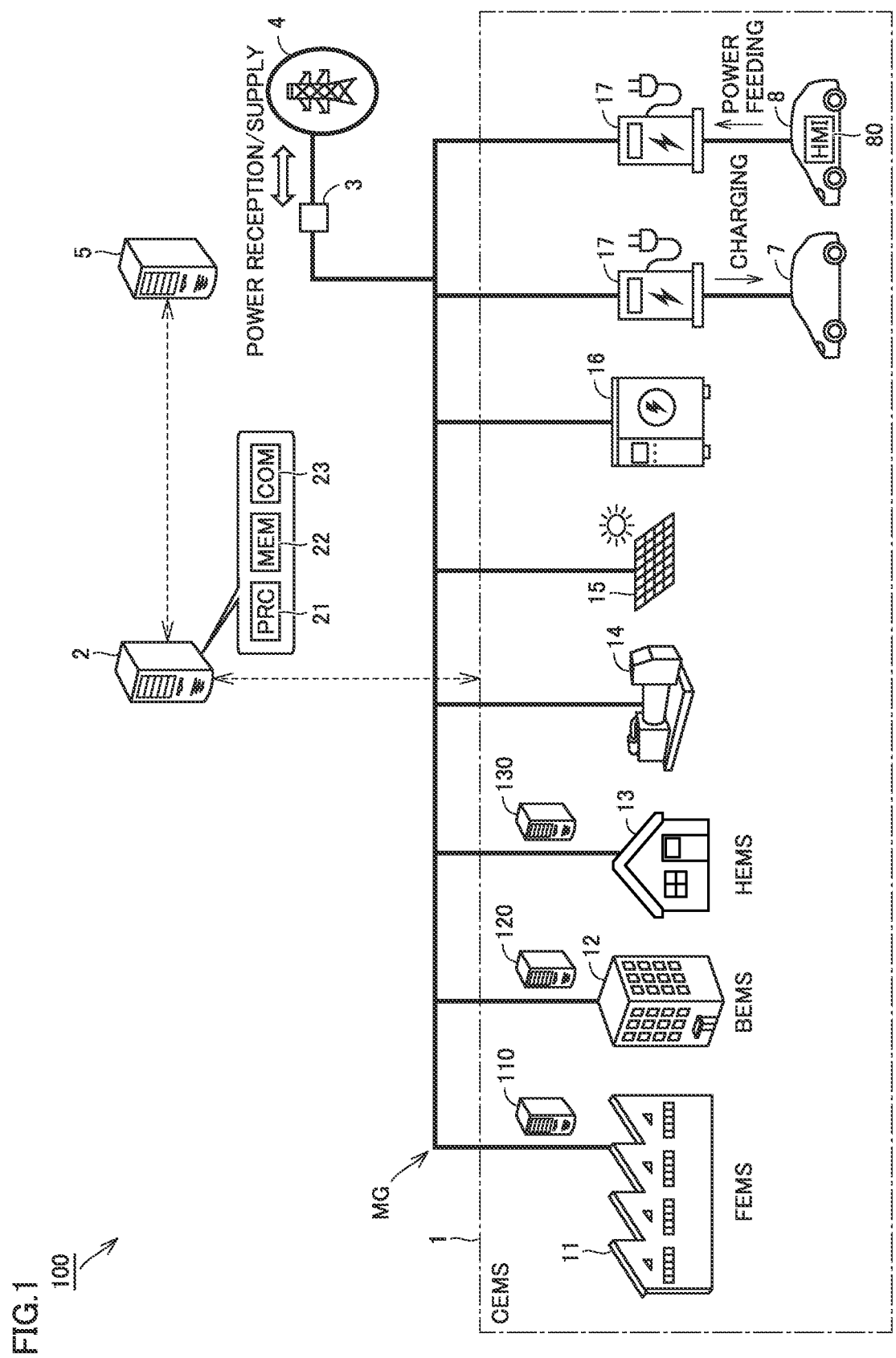
FIG. 1 shows a schematic configuration of a power management system according to a first embodiment of the present disclosure.

Embodiments of the present disclosure will be described in detail hereinafter with reference to the drawings, in which the same or corresponding portions are denoted by the same reference characters, and description thereof will not be repeated.

First Embodiment

<Overall Configuration of Power Management System>

FIG. 1 shows a schematic configuration of a power management system according to a first embodiment of the present disclosure. A power management system 100 includes a CEMS 1, a CEMS server 2, a power reception and transformation facility 3, a power system 4, and a power transmission and distribution business operator server 5. CEMS stands for Community Energy Management System or City Energy Management System.

CEMS 1 includes a factory energy management system (FEMS) 11, a building energy management system (BEMS) 12, a home energy management system (HEMS) 13, a power generator 14, a variable renewable energy (VRE) source 15, an energy storage system (ESS) 16, a plurality of electric vehicle supply equipment (EVSEs) 17, and a plurality of vehicles 7 and 8. In CEMS 1, these components form a microgrid MG. Microgrid MG corresponds to an example of "power grid" according to the present disclosure.

FEMS 11 is a system that manages supply and demand of electric power used in a factory. FEMS 11 includes a factory building (including a lighting fixture, an air-conditioning facility and the like), an industrial facility (such as a production line) and the like that operate using electric power supplied from microgrid MG. Although not shown, FEMS 11 may include a power generation facility (such as a power generator or a solar panel) placed in the factory. Electric power generated by the power generation facility may also be supplied to microgrid MG. FEMS 11 further includes an FEMS server 110 that can bidirectionally communicate with CEMS server 2.

BEMS 12 is a system that manages supply and demand of electric power used in a building such as an office or a commercial facility. BEMS 12 includes a lighting fixture and an air-conditioning facility placed in the building. BEMS 12 may include a power generation facility (such as a solar panel), or may include a cold source system (such as a waste heat recovery system or a heat storage system). BEMS 12 further includes a BEMS server 120 that can bidirectionally communicate with CEMS server 2.

HEMS 13 is a system that manages supply and demand of electric power used at home. HEMS 13 includes a household device (such as a lighting fixture, an air-conditioning device and another electric appliance) that operates using electric power supplied from microgrid MG. HEMS 13 may also include a solar panel, a household heat pump system, a household cogeneration system, a household power storage battery or the like. HEMS 13 further includes an HEMS server 130 that can bidirectionally communicate with CEMS server 2.

Power generator 14 is a power generation facility that does not depend on weather conditions, and outputs generated electric power to microgrid MG. Power generator 14 may include a steam turbine generator, a gas turbine generator, a diesel engine generator, a gas engine generator, a biomass generator, a stationary-type fuel cell or the like. Power generator 14 may include a cogeneration system that uses heat generated during power generation.

VRE source 15 is a power generation facility whose power generation output fluctuates depending on weather conditions, and outputs generated electric power to microgrid MG. Although FIG. 1 shows a photovoltaic power generation facility (solar panel) by way of example, VRE source 15 may include a wind power generation facility instead of or in addition to the photovoltaic power generation facility.

Energy storage system 16 is a stationary-type power source that stores the electric power generated by VRE source 15 and the like. Energy storage system 16 is a secondary battery, and is, for example, a battery (recycled battery) used in a vehicle, such as a lithium ion battery or a nickel-metal hydride battery. However, energy storage system 16 is not limited to the secondary battery, and may be a power to gas device that produces gas fuel (such as hydrogen or methane) using surplus electric power.

Each of the plurality of EVSEs 17 is electrically connected to microgrid MG so as to allow charging and discharging (power feeding) between EVSE 17 and microgrid MG. EVSEs 17 correspond to "power facilities" according to the present disclosure.

Specifically, the plurality of vehicles 7 and 8 may include a plug-in hybrid electric vehicle (PHEV), a battery electric vehicle (BEV), a plug-in fuel cell electric vehicle and the like. Each vehicle 8 includes a human machine interface (HMI) 80 for exchanging various types of information between vehicle 8 and a user. HMI 80 is implemented by, for example, a touch panel display (not shown) of a navigation system. Although not shown, each vehicle 7 also includes an HMI.

At least a part of the plurality of vehicles 7 and 8 are configured such that when a charging cable is connected to a vehicle inlet (not shown), electric power is supplied from microgrid MG to the vehicle. This manner of power supply will also be referred to as "external charging". At least a part of the plurality of vehicles 7 and 8 are also configured such that when the charging cable is connected to a vehicle outlet (not shown), electric power is supplied from the vehicle to microgrid. MG. This manner of power supply will also be referred to as "external power feeding". The plurality of vehicles 7 and 8 may also include a vehicle that performs both external charging and external power feeding.

In the following description, of the plurality of vehicles 7 and 8, a vehicle that is performing external charging or a vehicle that is to perform external charging will be denoted as "charging vehicle 7". In contrast, of the plurality of vehicles 7 and 8, a vehicle that is performing external power feeding or a vehicle that is to perform external power feeding will be denoted as "power feeding vehicle 8".

Although one FEMS 11, one BEMS 12, one HEMS 13, one power generator 14, one VRE source 15, and one energy storage system 16 are included in CEMS 1 in the example shown in FIG. 1, the number of these systems or facilities included in CEMS 1 is arbitrary. CEMS 1 may include a plurality of these systems or facilities. Alternatively, some of these systems or facilities may not be included in CEMS 1. FEMS 11, BEMS 12 and/or HEMS 13 may include a facility such as a power generator, or may include EV SEs 17, charging vehicles 7 and/or power feeding vehicles 8.

Each of FEMS 11 (such as a factory building and an industrial facility), BEMS 12 (such as a lighting fixture and an air-conditioning facility), HEMS 13 (such as a household device), power generator 14, VRE source 15, and energy storage system 16 included in CEMS 1 corresponds to an example of "a plurality of power adjustment resources" according to the present disclosure.

CEMS server 2 is a computer that manages the power adjustment resources in CEMS 1. CEMS server 2 includes a controller 21, a storage device 22 and a communication device 23. Controller 21 includes a processor, and executes a prescribed computation process. Storage device 22 includes a memory that stores a program executed by controller 21, and stores various types of information (such as a map, a relational equation and a parameter) used in the program. Communication device 23 includes a communication interface, and communicates with the outside (such as another server).

CEMS server 2 may be an aggregator server. The aggregator refers to an electric power supplier that controls a plurality of power adjustment resources and provides an energy management service. CEMS server 2 corresponds to an example of "server" according to the present disclosure. The server (110, 120, 130) included in each of FEMS 11, BEMS 12 and HEMS 13 can also serve as "server" according to the present disclosure.

Power reception and transformation facility 3 is provided at an interconnection point (power receiving point) of microgrid MG, and switches between parallel on (connection) and parallel off (disconnection) of microgrid MG and power system 4. Power reception and transformation facility 3 includes a high-voltage-side (primary-side) switchgear, a transformer, a protective relay, a measuring device, and a controller, although all are not shown. When microgrid MG is interconnected with power system 4, power reception and transformation facility 3 receives AC power having, for example, a particularly high voltage (voltage exceeding 7000 V) from power system 4, and steps down the received electric power, which is supplied to microgrid MG.

Power system 4 is a power grid formed by a power plant and a power transmission and distribution facility. In the present embodiment, an electric power company serves as a power generation business operator and a power transmission and distribution business operator. The electric power company corresponds to a general power transmission and distribution business operator and also corresponds to a manager of power system 4, and the electric power company performs maintenance and management of power system 4.

Power transmission and distribution business operator server 5 belongs to the electric power company, and is a computer that manages power supply and demand in power system 4, Power transmission and distribution business operator server 5 can also bidirectionally communicate with CEMS server 2.

<Balance of Power Supply and Demand>

In microgrid MG, it is required to maintain a balance of power supply and demand for power stabilization. The plurality of charging vehicles 7 and power feeding vehicles 8 may be electrically connected to microgrid MG. When many charging vehicles 7 try to perform external charging simultaneously, the balance of power supply and demand in microgrid MG enters an overdemand state and is lost, which may bring about a situation in which charging vehicles 7 cannot perform external charging immediately. As a result, charging vehicles 7 that await external charging may occur.

Figure 2:
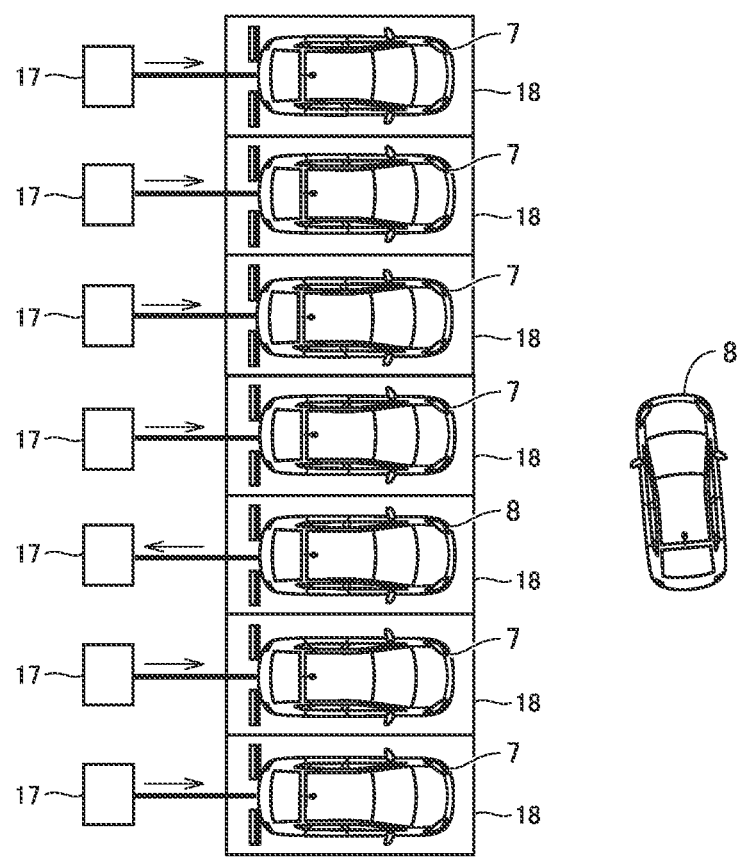
FIG. 2 is a diagram for illustrating a situation in which a balance of power supply and demand in a microgrid is in an overdemand state.

FIG. 2 is a diagram for illustrating a situation in which the balance of power supply and demand in microgrid MG is in the overdemand state. Each of the plurality of EVSEs 17 includes a parking space 18. Each parking space 18 is provided adjacent to EVSE 17.

When many charging vehicles 7 desire external charging, external power feeding from power feeding vehicles 8 to microgrid. MG may also be performed in order to maintain the balance of power supply and demand in microgrid MG. The fact that many charging vehicles 7 desire external charging means that EVSEs 17 corresponding thereto are already in use or about to be used. In the example shown in FIG. 2, most of EVSEs 17 are being used by many charging vehicles 7. With the use of EVSEs 17, all of parking spaces 18 are also occupied.

In CEMS 1, parking spaces 18 for using EVSEs 17 are limited. The user of power feeding vehicle 8 has an intention of cooperating with external power feeding to microgrid MG in order to maintain the balance of power supply and demand in microgrid MG. However, parking space 18 is not left for power feeding vehicle 8, and thus, external power feeding from power feeding vehicle 8 to microgrid MG cannot be performed. As a result, the situation in which the balance of power supply and demand in microgrid MG is in the overdemand state is not resolved, and thus, the situation in which charging vehicles 7 cannot perform external charging immediately may continue. Thus, in the present embodiment, when the balance of power supply and demand in microgrid MG is in the overdemand state, parking space 18 is secured for power feeding vehicle 8.

<Reservation Quotas of Parking Spaces>

In the present embodiment, when the balance of power supply and demand in microgrid MG is in the overdemand state (including when the balance of power supply and demand in microgrid MG is expected to enter the overdemand state in the near future), CEMS server 2 extracts power feeding vehicle 8 that is not using EVSE 1.7 (in other words, that is not parked in parking space 18), from the plurality of power feeding vehicles. Then, CEMS server 2 secures a reservation quota of parking space 18 for extracted power feeding vehicle 8.

FIG. 3 is a conceptual diagram for illustrating an example of reservation quotas of parking spaces 18. The reservation quotas for EVSEs 17 are defined by, for example, a location and a time slot. In the example shown in FIG. 3, only the reservation quotas about the three locations (parking spaces A to C) are shown due to space limitations. Actually, however, there may be more reservation quotas. In addition, in the example shown in FIG. 3, the time slot is divided into one-hour intervals. However, the way to divide the time slot can be arbitrarily set. The time slot may be divided into time intervals (e.g., two-hour intervals) longer than the one-hour intervals, or may be divided into time intervals (e.g., 30-minute intervals) shorter than the one-hour intervals. Such information about the reservation quotas is stored in storage device 22 of CEMS server 2.

"Reserved" indicates a reservation quota that has already been allocated to any one of the vehicles (charging vehicles 7 or power feeding vehicles 8). In contrast, "available" indicates a vacant reservation quota that is not allocated to any vehicle. CEMS server 2 allocates, to power feeding vehicle 8 that has responded to a power feeding request, a reservation quota of a parking space located close to a destination of power feeding vehicle 8 and corresponding to a time slot during which power feeding vehicle 8 is expected to arrive at the destination. In this example, the reservation quotas of the parking space C for two hours from 11 o'clock to 13 o'clock are allocated. These time slots are time slots during which the overdemand state in the balance of power supply and demand in microgrid MG is expected to occur.

The image shown in FIG. 3 may be displayed on HMI 80 such as the touch panel display of the navigation system mounted on power feeding vehicle 8. By operating HMI 80, the user of power feeding vehicle 8 can select which reservation quota is desired by the user. Thus, the reservation quota desired by the user can be allocated to power feeding vehicle 8. Instead of HMI 80, a mobile terminal (such as a smartphone) owned by the user may be used.

<Process Flow>

FIG. 4 is a flowchart showing a process related to allocation of parking space 18 in the first embodiment. This flowchart is invoked from a main routine (not shown) and repeatedly executed every time a predetermined condition is satisfied or at every predetermined cycle. In FIG. 4, a series of process executed by CEMS server 2 is shown on the left side, and a series of process executed by power feeding vehicle 8 is shown on the right side. Although each step is implemented by software processing by CEMS server 2 or power feeding vehicle 8, each step may be implemented by hardware (electric circuit) formed in CEMS server 2 or power feeding vehicle 8. Hereinafter, each step will be abbreviated as "S".

In S11, CEMS server 2 determines whether or not the overdemand state in the balance of power supply and demand in microgrid MG is expected to occur (may determine whether or not the balance of power supply and demand is in the overdemand state, as described below). For example, when a ratio of total consumed power of each facility in microgrid MG to supply power from power system 4 to microgrid MG may be higher than a prescribed value, CEMS server 2 can determine that the balance of power supply and demand is in the overdemand state. The supply power to microgrid MG may include electric power generated by each facility (such as power generator 14 and VRE source 15) in microgrid MG, electric power supplied from energy storage system 16 to microgrid MG, and the like.

Alternatively, based on the number of standby charging vehicles 7 (or a ratio of standby charging vehicles 7) that are not permitted to perform external power feeding by CEMS server 2 in spite of the desire to perform external power feeding, CEMS server 2 may determine whether or not the balance of power supply and demand in microgrid MG is in the overdemand state. Whether or not the overdemand state is expected to occur may be determined based on the history of the occurrence of the overdemand state under similar conditions (conditions about season, weather, temperature, day of the week, time slot, and the like) in the past.

When the balance of power supply and demand in microgrid MG is not in the overdemand state (NC) in S11, the subsequent process is not executed and the process is returned to the main routine. When the balance of power supply and demand is in the overdemand state (YES in S11), CEMS server 2 outputs a request for external power feeding to microgrid MG to power feeding vehicle 8 that is neither performing external power feeding nor parked in parking space 18 (S12).

The power feeding request may be output to a plurality of power feeding vehicles 8. CEMS server 2 regularly obtains the position information about the current locations of power feeding vehicles 8 located in CEMS 1 (and around GEMS 1). For example, CEMS server 2 may output the power feeding request to all of power feeding vehicles 8 that are parked in a particular area in CEMS 1 or are traveling in the particular area. Power feeding vehicles 8 to which the power feeding request is output are not limited to power feeding vehicles 8 located within CEMS 1 at that point in time. Power feeding vehicles 8 to which the power feeding request is output may also include the power feeding vehicles located outside CEMS 1 (e.g., around CEMS 1).

Power feeding vehicle 8 that has received the power feeding request answers whether or not to respond to the power feeding request (whether or not the power feeding request is acceptable) (S21). For example, when the user performs, on HMI 80, an operation indicating that the power feeding request is acceptable, power feeding vehicle 8 can answer that the power feeding request is acceptable. When power feeding vehicle 8 does not respond to the power feeding request (NO in S21), power feeding vehicle 8 returns the process to the main routine. When power feeding vehicle 8 responds to the power feeding request (YES in S21), power feeding vehicle 8 transmits, to CEMS server 2, information about the estimated time of arrival at the destination, together with information about the destination of power feeding vehicle 8 (S22).

When CEMS server 2 receives the information about the destination and the estimated arrival time of power feeding vehicle 8, CEMS server 2 selects a reservation quota of parking space 18 for power feeding vehicle 8 in consideration of the information, and proposes the reservation quota to power feeding vehicle 8 (S13). To power feeding vehicle 8 whose estimated time of arrival at the destination is included in the time slot in which the balance of power supply and demand in microgrid MG is expected to enter the overdemand state, CEMS server 2 can propose a reservation quota of parking space 18 located close to the destination of this power feeding vehicle 8 and having a certain long parkable time period.

CEMS server 2 may set a time period of allocation of the parking space to power feeding vehicle 8 longer, when a degree of overdemand in the balance of power supply and demand in microgrid MG is larger than a prescribed amount, as compared with when the degree of overdemand in the balance of power supply and demand in microgrid MG is smaller than the prescribed amount. That is, CEMS server 2 may increase a reward for external power feeding provided to power feeding vehicle 8. As a result, power feeding vehicle 8 can be further motivated to cooperate with external power feeding. CEMS server 2 proposes the selected reservation quota to power feeding vehicle 8.

Power feeding vehicle 8 answers, to CEMS server 2, whether or not to accept the reservation quota proposed by CEMS server 2. This answer can also be based on a user operation performed on HMI 80 (523).

When power feeding vehicle 8 accepts the proposed reservation quota (YES in S14), CEMS server 2 fixes the reservation quota (S15). That is, CEMS server 2 allocates EVSE 17 and parking space 18 for power feeding vehicle 8. When power feeding vehicle 8 does not accept the reservation quota (NC) in S14), CEMS server 2 returns the process to S13 and proposes another reservation quota. For example, CEMS server 2 may propose a reservation quota of parking space 18 located closer to the destination of power feeding vehicle 8 and having a shorter parking time period. Alternatively, CEMS server 2 may propose a reservation quota of parking space 18 located little far away from the destination of power feeding vehicle 8 and having a longer parking time period.

Thereafter, power feeding vehicle 8 travels until power feeding vehicle 8 arrives at the destination (NO in S24). When power feeding vehicle 8 arrives at the destination (YES in S24), power feeding vehicle 8 performs external power feeding to microgrid MG (S25).

As described above, in the first embodiment, when the balance of power supply and demand is expected to enter the overdemand state, parking space 18 (and thus EVSE 17 as well) is secured for power feeding vehicle 8. Since parking space 18 is provided near the destination and around the estimated time of arrival at the destination, the user of power feeding vehicle 8 is motivated to cooperate with external power feeding to microgrid MG. As for CEMS 1, by causing power feeding vehicle 8 to use EVSE 17, it is possible to prevent a situation in which the larger number of charging vehicles 7 await external charging although the overdemand state has already occurred. When power feeding from power feeding vehicle 8 to microgrid MG starts, the balance of power supply and demand in microgrid MG is improved, and thus, the larger number of charging vehicles 7 can also perform external charging. Thus, according to the first embodiment, the balance of power supply and demand in microgrid MG can be maintained, and as many charging vehicles 7 (e.g., standby charging vehicles 7) as possible can thereby perform charging.

In this example, parking space 18 for external power feeding is allocated to power feeding vehicle 8 when the balance of power supply and demand in microgrid MG is expected to enter the overdemand state. However, parking space 18 can also be similarly allocated when the balance of power supply and demand is already in the overdemand state. In this case, however, it is desirable to extract power feeding vehicle 8 having the earliest possible estimated time of arrival at the destination, when. CEMS server 2 outputs the power feeding request to power feeding vehicle 8 (S12). That is, CEMS server 2 may output the power feeding request more preferentially to power feeding vehicle 8 that is traveling toward a nearby destination, than power feeding vehicle 8 that is traveling toward a distant destination. This is because, by giving high priority to power feeding vehicle 8 that arrives at a destination in a short time, external power feeding can be started quickly and thus the balance of power supply and demand in microgrid MG can be improved at an early stage.

Second Embodiment

When the large number of charging vehicles 7 desire external charging, the remaining number of EVSEs 17 and parking spaces 18 can be very small. When EVSEs 17 and parking spaces 18 are valuable as described above, it is required to make the best use of EVSEs 17 and parking spaces 18 to improve the balance of power supply and demand in microgrid MG. In a second embodiment, allocation of a reservation quota to a vehicle that can supply larger electric power will be described. In other words, an auction of reservation quotas is performed in the second embodiment.

The number of power feeding vehicles 8 that participate in the auction is not limited as long as a plurality of power feeding vehicles 8 participate in the auction. However, for ease of understanding, an example in which two power feeding vehicles 8 participate in the auction will be described below. These two power feeding vehicles 8 are denoted as vehicles 8A and 8B in order to distinguish therebetween. Vehicles 8A and 8B are vehicles that have responded to the power feeding request.

FIG. 5 is a sequence diagram showing a process related to allocation of parking space 18 in the second embodiment. In this sequence diagram, sequence processes executed by vehicle 8A, vehicle 8B and CEMS server 2 are shown in this order from the left side to the right side.

In SQ311, vehicle 8A accepts the power feeding request output from CEMS server 2, and requests allocation of a reservation quota of parking space 18 in exchange for external power feeding. Then, vehicle 8A transmits, to CEMS server 2, information about a destination and an estimated arrival time of vehicle 8A (SQ312).

Similarly, vehicle 8B also accepts the power feeding request output from CEMS server 2, and requests allocation of a reservation quota of parking space 18 (SQ321). In addition, vehicle 8B transmits, to CEMS server 2, information about a destination and an estimated arrival time of vehicle 8B (SQ322). Herein, a situation in which vehicle 8A and vehicle 8B have in common in terms of their destination and estimated arrival time is assumed.

In SQ301, based on the pieces of information about the destination and the estimated arrival time transmitted from vehicles 8A and 8B (and not-shown other vehicles that have responded to the power feeding request), CEMS server 2 extracts candidates that participate in an auction. In this example, vehicles 8A and 8B are extracted as the candidates, CEMS server 2 proposes reservation quotas of parking spaces for external power feeding to vehicles 8A and 8B.

In SQ313, in vehicle 8A, the user operates HMI 80 or the mobile terminal, such that an amount of power that can be supplied from vehicle 8A by external power feeding is input as a reward for securing the reservation quota proposed by CEMS server 2. In other words, in vehicle 8A, bidding of the reservation quota is performed, A signal indicating the amount of supplied power (in other words, bid amount) is transmitted from vehicle 8A to CEMS server 2.

Similarly, in vehicle 8B, bidding of the reservation quota is performed (SQ323). A signal indicating the amount of supplied power (bid amount) is also transmitted from vehicle 8B to CEMS server 2.

In SQ302, CEMS server 2 determines that a vehicle having a larger amount of supplied power (i.e., a vehicle presenting a higher bid amount), of vehicles 8A and 8B, wins the bidding of the reservation quota. In the example shown in FIG. 5, vehicle 8B wins the bidding of the reservation quota. CEMS server 2 allocates the reservation quota to vehicle 8B (SQ303), Thereafter, when vehicle 8B arrives at the destination, vehicle 8B performs external power feeding to microgrid MG (SQ324).

As described above, in the second embodiment, when the plurality of vehicles 8A and 8B express their intentions of performing external power feeding, the auction of the reservation quotas is performed and the reservation quota is allocated to the vehicle that can supply a larger amount of power by external power feeding. Thus, the limited reservation quota can be allocated to the vehicle that can contribute more greatly to improvement of the balance of power supply and demand in microgrid MG.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A power management system comprising:
a plurality of power adjustment resources electrically connected to a power grid; and
a server that manages the plurality of power adjustment resources, wherein
the plurality of power adjustment resources include a plurality of power facilities, each of the plurality of power facilities including a parking space,
when any one of a plurality of power feeding vehicles is parked in the parking space, a power facility including the parking space enables power feeding from a vehicle parked in the parking space to the power grid,
the server manages the parking space,
when a balance of power supply and demand in the power grid is in an overdemand state,
the server outputs, to a power feeding vehicle of the plurality of power feeding vehicles, a request for power feeding to the power grid,
when the power feeding vehicle responds to the request, the power feeding vehicle transmits, to the server, information about a destination of the power feeding vehicle and an estimated time of arrival at the destination,
when the server receives the information, the server proposes a first reservation quota of a parking space located close to the destination and having a certain parkable time period, and
when the power feeding vehicle accepts the first reservation quota, the server fixes the reservation quota.

2. The power management system according to claim 1, wherein
when any one of a plurality of charging vehicles is parked in the parking space, each of the plurality of power facilities enables charging from the power grid to a charging vehicle parked in the parking space, and
when the balance of power supply and demand is in the overdemand state and at least a part of the plurality of charging vehicles await charging, the server allocates the parking space to the power feeding vehicle.

3. The power management system according to claim 1, wherein
when there is a time slot in which the balance of power supply and demand is expected to enter the overdemand state, the server reserves the parking space for the power feeding vehicle so as to correspond to the time slot.

4. The power management system according to claim 1, wherein
the server sets a time period of allocation of the parking space to the power feeding vehicle longer, when a degree of overdemand in the balance of power supply and demand is larger than a prescribed amount, as compared with when the degree is smaller than the prescribed amount.

5. The power management system according to claim 1, wherein
when there are a plurality of power feeding vehicles that respond to the request for power feeding, the server allocates the parking space to a power feeding vehicle that supplies larger electric power to the power grid, of the plurality of power feeding vehicles.

6. The power management system according to claim 1, wherein
when the power feeding vehicle does not accept the first reservation quota, the server proposes a second reservation quota of a parking space located closer to the destination and having a shorter parking time period, compared with the first reservation quota.

7. A server that manages a plurality of power adjustment resources electrically connected to a power grid, wherein
the plurality of power adjustment resources include a plurality of power facilities, each of the plurality of power facilities including a parking space,
when any one of a plurality of power feeding vehicles is parked in the parking space, a power facility including the parking space enables power feeding from a vehicle parked in the parking space to the power grid,
the server includes:
a processor; and
a memory that stores a program executed by the processor, and
when a balance of power supply and demand in the power grid is in an overdemand state,
the processor outputs, to a power feeding vehicle of the plurality of power feeding vehicles, a request for power feeding to the power grid, when the power feeding vehicle responds to the request, the power feeding vehicle transmits, to the processor, information about a destination of the power feeding vehicle and an estimated time of arrival at the destination, when the processor receives the information, the processor proposes a first reservation quota of a parking space located close to the destination and having a certain parkable time period, and when the power feeding vehicle accepts the first reservation quota, the processor fixes the reservation quota.

8. The server according to claim 7, wherein when the power feeding vehicle does not accept the first reservation quota, the processor proposes a second reservation quota of a parking space located closer to the destination and having a shorter parking time period, compared with the first reservation quota.

9. A power supply and demand adjustment method that manages a plurality of power adjustment resources electrically connected to a power grid, wherein the plurality of power adjustment resources include a plurality of power facilities, each of the plurality of power facilities including a parking space, when any one of a plurality of power feeding vehicles is parked in the parking space, a power facility including the parking space enables power feeding from a vehicle parked in the parking space to the power grid, and the method comprising:

when a balance of power supply and demand in the power grid is in an overdemand state, outputting, from a server that manages the plurality of power adjustment resources to a power feeding vehicle of the plurality of power feeding vehicles, a request for power feeding to the power grid;

when the power feeding vehicle responds to the request, transmitting, from the power feeding vehicle to the server, information about a destination of the power feeding vehicle and an estimated time of arrival at the destination;

when the server receives the information, proposing, from the server to the power feeding vehicle, a first reservation quota of a parking spaced located close to the destination and having a certain parkable time period;

when the power feeding vehicle accepts the first reservation quota, fixing the reservation quota by the server; and causing the power feeding vehicle that receives allocation of the parking space to perform power feeding to the power grid.

10. The method according to claim 9, wherein when the power feeding vehicle does not accept the first reservation quota, the server proposes a second reservation quota of a parking space located closer to the destination and having a shorter parking time period, compared with the first reservation quota.

* * * * *